R. AUE.
TIRE PROTECTOR.
APPLICATION FILED FEB. 28, 1911.
1,006,712.
Patented Oct. 24, 1911.
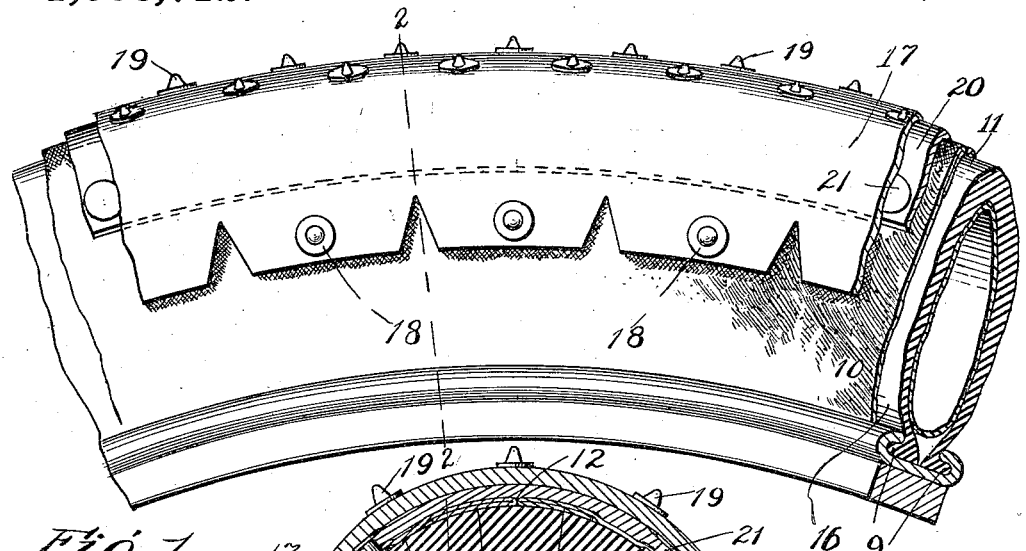
Fig. 1.
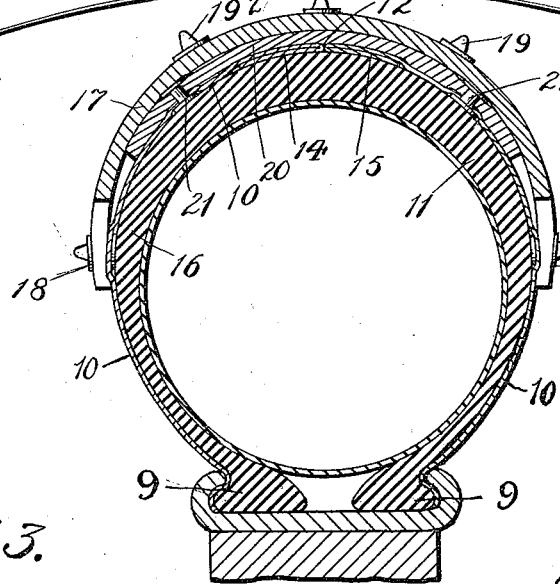
Fig. 2.
Fig. 3.
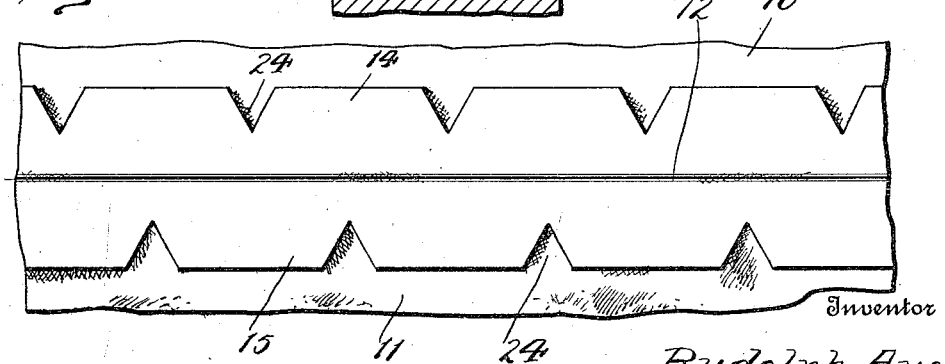
Witnesses
Inventor
Rudolph Aue
By
Attorneys.
COLUMBIA PLANOGRAPH CO., WASHINGTON, D. C.

UNITED STATES PATENT OFFICE.

RUDOLPH AUE, OF SAN ANTONIO, TEXAS.

TIRE-PROTECTOR.

1,006,712.

Specification of Letters Patent.  Patented Oct. 24, 1911.

Application filed February 28, 1911. Serial No. 611,479.

*To all whom it may concern:*

Be it known that I, RUDOLPH AUE, citizen of the United States, residing at San Antonio, in the county of Bexar and State of Texas, have invented certain new and useful Improvements in Tire-Protectors, of which the following is a specification.

This invention relates to improvements in protectors for pneumatic tires, and has for one of its objects to provide a simply constructed device of this character which may be readily applied to tires without structural change of any kind, and to tires of different sizes.

Another object of the invention is to provide a device of this character which is dust and waterproof, is light and strong, and whose weight will not burden the tire, and which may also be readily attached to or detached from a tire and stored in a relatively small space when not required.

Another object of the invention is to provide a device of this character which effectually protects the relatively fragile material from which the tire is constructed from puncture or abrasion and without lessening its efficiency and durability.

Another object of the invention is to provide a device of this character which not only protects the tire from puncture and abrasion, but also forms an effectual hill climbing attachment without materially increasing the weight of the tire.

With these and other objects in view, the invention consists in certain novel features of construction as hereinafter shown and described and then specifically pointed out in the claims, and in the drawings illustrative of the preferred embodiment of the invention, Figure 1 is a side elevation of a portion of a wheel tire with the improvement applied; Fig. 2 is a transverse section, enlarged, on the line 2—2 of Fig. 1; and Fig. 3 is a view of a portion of the inner strip from the interior, illustrating its construction.

Corresponding and like parts are referred to in the following description and indicated in all the views of the accompanying drawings by the same reference characters.

The improved device includes an inner strip like member of fabric, preferably of heavy canvas, completely covering the outer casing and carried around the " clench " portions 9 and locked therewith. The improved device further includes an outer strip of non-puncturable material, preferably of rawhide, and of less width than the fabric strip, and connected at its edges to the latter, and an intermediate strip of non-puncturable material, such as rawhide and of less width than the outer rawhide strip, and likewise secured at its edges to the fabric strip. The inner strip is preferably formed of two portions 10—11 united at their edges by stitching, represented at 12, and with the edges turned inwardly, as shown at 14—15, so that when the strip is applied around a pneumatic tire, represented conventionally at 16, the underlap 14 will be pressed against the portion 10, while the underlap 15 will be pressed against the portion 11 and thus providing two thicknesses of the fabric at the center. This is an important feature of applicant's device and increases its efficiency and utility and strengthens the tire where the greatest strains occur.

The outer edges of the inturned portions 14—15 are notched at short intervals, as represented at 24, so that strips adapt themselves more readily to the curvature of the tire when placed around the same.

The outer strip of non-puncturable material, such as rawhide, is represented as a whole at 17, and is of less width than the fabric members 10—11 and secured to the fabric members by rivets or other suitable fastening devices 18. The member 17 is preferably notched along its edges and rivets are applied between the notches, as shown in Fig. 1, the notching permitting the member 17 to more readily adapt itself to the curvature of the tire, and without producing wrinkles or irregularities in the surface. The member 17 is also provided with a plurality of outwardly directed projections 19, preferably formed by securing metal rivets through the member 17 at suitable intervals, the projecting portions of the rivets forming spurs which not only protect the body of the tire when moving over the ground, but likewise serve to increase the grip or traction when the vehicle is traveling up steep inclines, or to form what is known as a hill climbing attachment.

The inner rawhide strip is represented as a whole at 20, and, as before stated, is of less width than the outer strip 17 and secured along its edges by rivets or other suitable fastening devices 21 to the members 10—11 of the fabric strip.

The strips 17—20 when constructed from rawhide are first treated in any suitable manner to soften the material to enable it to be molded around the tire and to be curved to correspond therewith, and when it becomes dry it will retain the curvature which has been imparted to it. By this arrangement it will be noted that the outer central portion of the tire is protected by four thicknesses of the material, the inturned portions 14—15 of the fabric, the inner rawhide strip 20 and the outer rawhide strip 17, besides the protection afforded by the spurs 19. By this means the greatest strength and support is given to the tire when the greatest strains occur, and also where the punctures are most liable to occur, and by riveting the strips 17—20 to the fabric and firmly coupling the fabric with its attachments to the tire, the device will not be displaced when in use.

The improved device is simple in construction can be inexpensively manufactured and of any suitable material.

Having thus described the invention, what is claimed as new is:

1. A tire protector comprising a strip of fabric for bearing over a pneumatic tire, a relatively narrow strip of flexible non-puncturable material bearing upon the fabric strip, a relatively wide strip of flexible non-puncturable material bearing over the narrower strip of non-puncturable material and in contact with the fabric strip, and means for independently securing said non-puncturable strips to the fabric strip.

2. A tire protector comprising a fabric member in two portions with their confronting edges folded under and united by stitching to reinforce the central portion of the fabric member, a relatively narrow strip of rawhide bearing upon the reinforced portion of the fabric strip, a relatively wide strip of rawhide bearing over said narrower strip and upon the fabric strip, and means for connecting the strips of rawhide to the fabric strip.

3. A tire protector comprising a strip of fabric, a relatively narrow strip of rawhide bearing upon the strip of fabric, a relatively wide strip of rawhide bearing over the narrower strip of rawhide and in contact with the fabric strip, said wider rawhide strip having notches in its edges, fastening devices applied through the material between the notches for connecting the wider rawhide strip to the fabric, and fastening devices connecting the narrower strip to the fabric.

In testimony whereof, I affix my signature in presence of two witnesses.

RUDOLPH AUE. [L. S.]

Witnesses:
HENRY C. KING, Jr.,
A. R. HOPPER.

---

Copies of this patent may be obtained for five cents each, by addressing the "Commissioner of Patents, Washington, D. C."